(12) United States Patent
Soda

(10) Patent No.: US 7,724,900 B2
(45) Date of Patent: May 25, 2010

(54) METHOD, APPARATUS, AND PROGRAM FOR PROCESSING INFORMATION

(75) Inventor: Atsumu Soda, Tokyo (JP)

(73) Assignee: Sony Corporation, Tokyo (JP)

( * ) Notice: Subject to any disclaimer, the term of this patent is extended or adjusted under 35 U.S.C. 154(b) by 959 days.

(21) Appl. No.: 11/495,568

(22) Filed: Jul. 31, 2006

(65) Prior Publication Data

US 2007/0030964 A1    Feb. 8, 2007

(30) Foreign Application Priority Data

Aug. 4, 2005    (JP) .............................. 2005-226244

(51) Int. Cl.
*H04N 7/167* (2006.01)
(52) U.S. Cl. ...................................... 380/200; 725/31
(58) Field of Classification Search .................. 380/44, 380/200; 725/31
See application file for complete search history.

(56) References Cited

U.S. PATENT DOCUMENTS

| 6,253,193 | B1 * | 6/2001 | Ginter et al. ................... 705/57 |
| 7,213,005 | B2 * | 5/2007 | Mourad et al. ................. 705/64 |
| 7,395,245 | B2 * | 7/2008 | Okamoto et al. .............. 705/59 |
| 2001/0044899 | A1 | 11/2001 | Levy |
| 2004/0143732 | A1 * | 7/2004 | Choi et al. ................... 713/151 |
| 2005/0180573 | A1 * | 8/2005 | Pelly et al. ................... 380/277 |
| 2005/0286437 | A1 * | 12/2005 | Matsushita et al. ........... 370/252 |
| 2006/0282864 | A1 * | 12/2006 | Gupte ........................... 725/89 |

FOREIGN PATENT DOCUMENTS

| JP | 11-340966 | 12/1999 |
| JP | 2000-287192 | 10/2000 |
| JP | 2000-293936 | 10/2000 |
| JP | 2001-86481 | 3/2001 |
| JP | 2002-176419 | 6/2002 |
| JP | 2002-203070 | 7/2002 |
| JP | 2002-217894 | 8/2002 |
| JP | 2002-251328 | 9/2002 |

(Continued)

OTHER PUBLICATIONS

SMPTE Standard for D-Cinema date: Mar. 15, 2005 FDC-Rev 2.*

(Continued)

*Primary Examiner*—Minh Dieu Nguyen
(74) *Attorney, Agent, or Firm*—Oblon, Spivak, McClelland, Maier & Neustadt, L.L.P.

(57) ABSTRACT

An information processing apparatus decrypts stream data encrypted according to a first encryption method using a key encrypted according to a second encryption method. In the apparatus, an update instructing unit identifies the update timings of decryption keys and issues an update command. A decryption key output unit outputs a first decryption key before receiving the update command and outputs a second decryption key generated subsequent to the first decryption key after receiving the update command. An update instruction control unit determines whether the second decryption key has been generated before the first decryption key is updated to the second decryption key. When the second decryption key is generated, the update instruction control unit considers the second key generation point in time to be the update timing from the first decryption key to the second decryption key so as to control the update instructing unit to issue the update command.

6 Claims, 10 Drawing Sheets

FOREIGN PATENT DOCUMENTS

| JP | 2003-143548 | 5/2003 |
|---|---|---|
| JP | 2003-528538 | 9/2003 |
| JP | 2004-96754 | 3/2004 |
| JP | 2004-133801 | 4/2004 |
| JP | 2005-217843 | 8/2005 |
| WO | WO 00/52690 | 9/2000 |
| WO | WO 2005/043806 A1 | 5/2005 |

OTHER PUBLICATIONS

U.S. Appl. No. 11/459,804, filed Jul. 25, 2006, Soda.

* cited by examiner

METHOD, APPARATUS, AND PROGRAM FOR PROCESSING INFORMATION

CROSS REFERENCES TO RELATED APPLICATIONS

The present invention contains subject matter related to Japanese Patent Application JP 2005-226244 filed in the Japanese Patent Office on Aug. 4, 2005, the entire contents of which are incorporated herein by reference.

BACKGROUND OF THE INVENTION

1. Field of the Invention

The present invention relates to a method, an apparatus, and a program for processing information and, in particular, to a method, an apparatus, and a program that can minimize an adverse effect that occurs when a key required for decrypting stream data is encrypted and an operation for decrypting the key is not completed in time.

2. Description of the Related Art

In recent years, an encryption method has been proposed in which stream data including a plurality of successive units of data is sequentially encrypted on a unit-by-unit basis and an encryption key used for encrypting each of the units of data is changed according to a predetermined rule (refer to, for example, Japanese Unexamined Patent Application Publication No. 2003-143548).

In addition, the development of an encrypting apparatus that encrypts stream data according to such an encryption method and generates meta data including a plurality of encryption keys used for encrypting the stream data and update information for identifying the timings of updating the encryption keys has started.

Furthermore, the development of a decrypting apparatus that decrypts data encrypted using such an encrypting apparatus by using the meta data generated by the encrypting apparatus has started.

Furthermore, in order to enhance the confidentiality of these encryption keys, a technique for encrypting these encryption keys according to a second encryption method and inserting the encryption keys into meta data has been developed.

Accordingly, in this case, to decrypt each of the plurality of encryption keys encrypted according to the second method contained in the meta data, the decrypting apparatus needs to generate each of the plurality of decryption keys and carry out a decrypting operation using each of the decryption keys.

SUMMARY OF THE INVENTION

However, unless the decrypting apparatus generates a key used for a decrypting operation of the stream data among the plurality of keys encrypted using the second encryption method before the decrypting apparatus carries out the decrypting operation, the decrypting apparatus cannot normally carry out the decrypting operation.

That is, when a key used for decrypting the stream data has been encrypted and a decrypting operation of the key is not completed in time, the adverse effect that the decrypting operation of the stream data cannot be carried out arises. Accordingly, it is desirable that the adverse effect is minimized.

Accordingly, the present invention provides a method, an apparatus, and a program of processing information that can minimize the adverse effect that occurs when a key used for decrypting the stream data has been encrypted and a decrypting operation of the key is not completed in time.

According to an embodiment of the present invention, an information processing apparatus decrypts, using meta data, encrypted data obtained by encrypting stream data including a plurality of successive units of data according to a first encryption method in which, when the stream data is sequentially encrypted on a unit-by-unit basis, each of a plurality of encryption keys used for encrypting a corresponding one of the units of data is updated on the basis of a predetermined rule. The meta data includes the plurality of the encryption keys used for encrypting the stream data and update information for identifying update timings of the plurality of encryption keys. The information processing apparatus includes a decrypter configured to acquire the encrypted data and decrypt each of the encrypted units of data in the encrypted data using a decryption key corresponding to the encryption key used for encrypting the unit of data among the plurality of encryption keys and a meta data acquirer configured to acquire the meta data, generate each of the plurality of decryption keys corresponding to one of the plurality of encryption keys contained in the meta data, and deliver the corresponding one of the plurality of decryption keys to the decrypter in accordance with the update information contained in the meta data. The plurality of encryption key are encrypted according to a second encryption method and the meta data acquirer includes a decryption key generating unit, an update instructing unit, a decryption key output unit, and an update instruction control unit. The decryption key generating unit sequentially generates each of the plurality of decryption keys by decrypting one of the plurality of encryption keys contained in the meta data and encrypted using the second encryption method in an order in which the keys are used for encryption. The update instructing unit identifies the update timing of each of the decryption keys corresponding to the update timing of one of the encryption keys and issues an update command at each identified update timing. The decryption key output unit outputs a first decryption key generated by the decryption key generating unit until the update instructing unit issues the update command to the decrypter and outputs a second decryption key generated subsequent to the first decryption key by the decryption key generating unit to the decrypter after the update instructing unit issues the update command. The update instruction control unit determines whether the second decryption key has been generated by the decryption key generating unit before the first decryption key is updated to the second decryption key and monitors whether the second decryption key is generated if the update instruction control unit determines that the second decryption key has not been generated yet. When the second decryption key is generated, the update instruction control unit considers the second decryption key generation point in time to be the update timing from the first decryption key to the second decryption key so as to control the update instructing unit to issue the update command.

Each of the plurality of encryption keys can include a key ID for identifying the encryption key and the meta data can include Meta packets 1, 2, and 3 that are generated for each of the plurality of units of data and that comply with Society of Motion Picture and Television Engineers (SMPTE) 291M. A predetermined one of the plurality of encryption keys encrypted according to the second encryption method can be included in the Meta packets 1 and 2 associated with a predetermined unit of data, and at least Next Key ID and Current Key ID can be included in the Meta packet 3 associated with each of the units of data.

The update instruction control unit can compare a Key ID of an encryption key corresponding to a decryption key generated by the decryption key generating unit immediately before an update timing from the first decryption key to the second decryption key with the Next Key ID contained in the Meta packet 3 associated with the unit of data immediately before the update timing from the first decryption key to the second decryption key. If the Key ID is equal to the Next Key ID, the update instruction control unit can determine that the second decryption key has been generated by the decryption key generating unit. If the Key ID is not equal to the Next Key ID, the update instruction control unit can determine that the second decryption key has not been generated by the decryption key generating unit.

If the update instruction control unit determines that the second decryption key has not been generated by the decryption key generating unit, the update instruction control unit can compare a Key ID of the encryption key corresponding to the latest decryption key generated by the decryption key generating unit after a first point in time at which the determination is made with the Current Key ID contained in the Meta packet 3 associated with a unit of data after the first point in time. If the Key ID is equal to the Current Key ID, the update instruction control unit can determine that the second decryption key has been generated by the decryption key generating unit, can consider a second point in time at which the determination is made to be an update timing from the first decryption key to the second decryption key, and can force the update instructing unit to issue the update command.

According to another embodiment of the present invention, an information processing method is provided for use in an information processing apparatus configured to decrypt, using meta data, encrypted data obtained by encrypting stream data including a plurality of successive units of data according to a first encryption method in which, when the stream data is sequentially encrypted on a unit-by-unit basis, each of a plurality of encryption keys used for encrypting a corresponding one of the units of data is updated on the basis of a predetermined rule. The meta data includes the plurality of the encryption keys used for encrypting the stream data and update information for identifying update timings of the plurality of encryption keys. The information processing apparatus includes a decrypter configured to acquire the encrypted data and decrypt each of the encrypted units of data in the encrypted data using a decryption key corresponding to the encryption key used for encrypting the unit of data among the plurality of encryption keys, wherein the plurality of encryption key are encrypted according to a second encryption method. The information processing method includes the steps of acquiring the meta data, sequentially generating each of the plurality of decryption keys by decrypting one of the plurality of encryption keys contained in the meta data and encrypted using the second encryption method in an order in which the keys are used for encryption, identifying the update timing of each of the decryption keys corresponding to the update timing of one of the encryption keys and issuing an update command at each identified update timing, outputting a first generated decryption key until the update command is issued and outputting a second decryption key generated subsequent to the first decryption key after the update command is issued, determining whether the second decryption key has been generated before the first decryption key is updated to the second decryption key, monitoring whether the second decryption key is generated if the second decryption key has not been generated yet, and, when the second decryption key is generated, considering the second decryption key generation point in time to be the update timing from the first decryption key to the second decryption key so as to perform control to issue the update command.

According to still another embodiment of the present invention, a program is provided for causing a computer to decrypt, using meta data, encrypted data obtained by encrypting stream data including a plurality of successive units of data according to a first encryption method in which, when the stream data is sequentially encrypted on a unit-by-unit basis, each of a plurality of encryption keys used for encrypting a corresponding one of the units of data is updated on the basis of a predetermined rule. The meta data includes the plurality of the encryption keys used for encrypting the stream data and update information for identifying update timings of the plurality of encryption keys. The program causes the computer to acquire the encrypted data and decrypt each of the encrypted units of data in the encrypted data using a decryption key corresponding to the encryption key used for encrypting the unit of data among the plurality of encryption keys. The plurality of encryption key are encrypted according to a second encryption method. The program includes the steps of acquiring the meta data, sequentially generating each of the plurality of decryption keys by decrypting one of the plurality of encryption keys contained in the meta data and encrypted using the second encryption method in an order in which the keys are used for encryption, identifying the update timing of each of the decryption keys corresponding to the update timing of one of the encryption keys and issuing an update command at each identified update timing, outputting a first generated decryption key until the update command is issued and outputting a second decryption key generated subsequent to the first decryption key after the update command is issued, determining whether the second decryption key has been generated before the first decryption key is updated to the second decryption key, monitoring whether the second decryption key is generated if the second decryption key has not been generated yet, and, when the second decryption key is generated, considering the second decryption key generation point in time to be the update timing from the first decryption key to the second decryption key so as to perform control to issue the update command.

According to yet another embodiment of the present invention, a decrypting process is executed so as to decrypt, using meta data, encrypted data obtained by encrypting stream data including a plurality of successive units of data according to a first encryption method in which, when the stream data is sequentially encrypted on a unit-by-unit basis, each of a plurality of encryption keys used for encrypting a corresponding one of the units of data is updated on the basis of a predetermined rule. The meta data includes the plurality of the encryption keys used for encrypting the stream data and update information for identifying update timings of the plurality of encryption keys. The decrypting process acquires the encrypted data and decrypts each of the encrypted units of data in the encrypted data using a decryption key corresponding to the encryption key used for encrypting the unit of data among the plurality of encryption keys. When the decrypting process is executed, the plurality of encryption key are encrypted according to a second encryption method. The decrypting process acquires the meta data, sequentially generates each of the plurality of decryption keys by decrypting one of the plurality of encryption keys contained in the meta data and encrypted using the second encryption method in an order in which the keys are used for encryption, identifies the update timing of each of the decryption keys corresponding to the update timing of one of the encryption keys and issues an update command at each identified update timing, outputs a first generated decryption key until the update command is issued, and outputs a second decryption key generated subsequent to the first decryption key after the update command is issued. At that time, the decrypting process determines whether the second decryption key has been generated before the first decryption key is updated to the second decryption key. If the second decryption key has not been generated yet, the decrypting process monitors whether the second decryption key is generated. When the second decryption key is generated, the decrypting process considers the second decryption key generation point in time to be the update timing from the first decryption key to the second decryption key so as to perform control to issue the update command.

As described above, according to the embodiment of the present invention, when a key used for decrypting stream data is encrypted, the method, the apparatus, and the program for processing information can decrypt the key and subsequently decrypt the stream data. In particular, the method, the apparatus, and the program for processing information can minimize the adverse effect that occurs when a decrypting operation of the key is not completed in time.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 1:
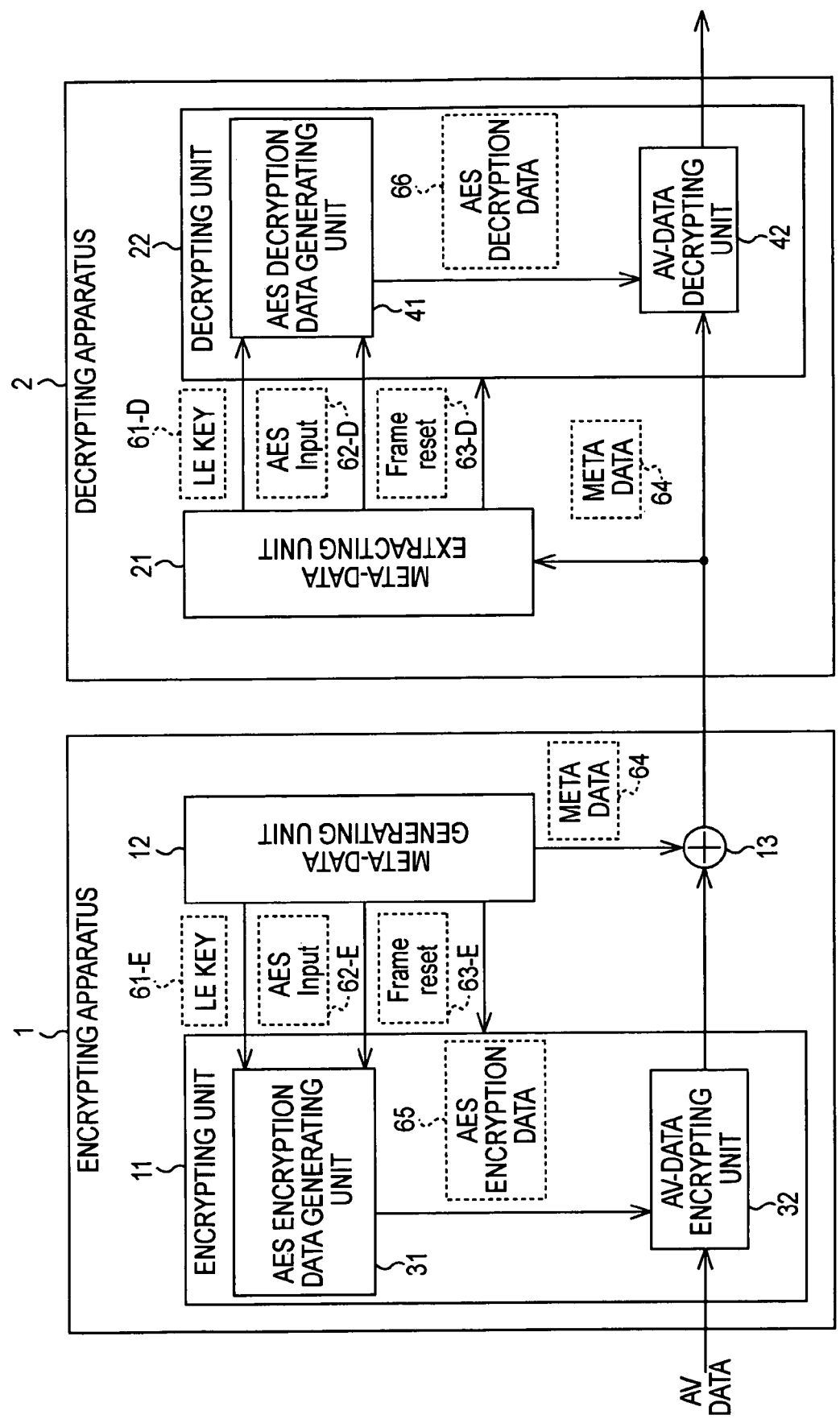
FIG. 1 illustrates an exemplary configuration of an encrypting/decrypting system according to an embodiment of the present invention.

According to an embodiment of the present invention, an information processing apparatus (e.g., a decrypting apparatus 2 shown in FIG. 1) decrypts, using meta data (e.g., meta data 64 in FIG. 1 including meta data 64-3 in FIG. 4), encrypted data (e.g., encrypted AV data output from an AV-data encrypting unit 32 of an encrypting unit 11 shown in FIG. 1) obtained by encrypting stream data including a plurality of successive units of data (e.g., AV data in FIG. 1) according to a first encryption method (e.g., an encryption method using AES shown in FIG. 6) in which, when the stream data is sequentially encrypted on a unit-by-unit basis, a key (e.g., an LE key 61-E in FIG. 1 encrypted with RSA in the following example) used for encrypting each of the units of data is updated on the basis of a predetermined rule. As used herein, the term "unit of data" is referred to as a frame (data), which will be described below. The meta data includes the plurality of encryption keys used for encrypting the stream data and update information (e.g., Key Change Timing in FIG. 4) for identifying update timings of the plurality of keys. The information processing apparatus includes a decrypter (e.g., a decrypting unit 22) configured to acquire the encrypted data and decrypt each of the encrypted units of data in the encrypted data using a decryption key (e.g., an LE key 61-D in FIG. 1) corresponding to the encryption key used for encrypting the unit of data among the plurality of encryption keys and a meta data acquirer (e.g., a meta data extracting unit 21 in FIG. 1 having a configuration shown in FIG. 5) configured to acquire the meta data, generate each of the plurality of decryption keys corresponding to one of the plurality of encryption keys contained in the meta data, and deliver the corresponding one of the plurality of decryption keys to the decrypter in accordance with the update information contained in the meta data. The plurality of encryption key are encrypted according to a second encryption method (e.g., an encryption method using RSA described below). The meta data acquirer includes a decryption key generating unit (e.g., an LEKP restoring unit 102 in FIG. 5), an update instructing unit (e.g., a key change trigger generating unit 104 in FIG. 5), a decryption key output unit (e.g., a register 105 in FIG. 5), and an update instruction control unit (e.g., a key change timing correction unit 111 in FIG. 5). The decryption key generating unit sequentially generates each of the plurality of decryption keys by decrypting one of the plurality of encryption keys contained in the meta data and encrypted using the second encryption method in an order in which the keys are used for encryption. The update instructing unit identifies the update timing of each of the decryption keys corresponding to the update timing of one of the encryption keys and issues an update command at each identified update timing. The decryption key output unit outputs a first decryption key generated by the decryption key generating unit until the update instructing unit issues the update command to the decrypter and outputs a second decryption key generated subsequent to the first decryption key by the decryption key generating unit to the decrypter after the update instructing unit issues the update command. The update instruction control unit determines whether the second decryption key has been generated by the decryption key generating unit before the first decryption key is updated to the second decryption key and monitors whether the second decryption key is generated if the update instruction control unit determines that the second decryption key has not been generated yet. When the second decryption key is generated, the update instruction control unit considers the second decryption key generation point in time to be the update timing from the first decryption key to the second decryption key so as to control the update instructing unit to issue the update command.

Figure 2:
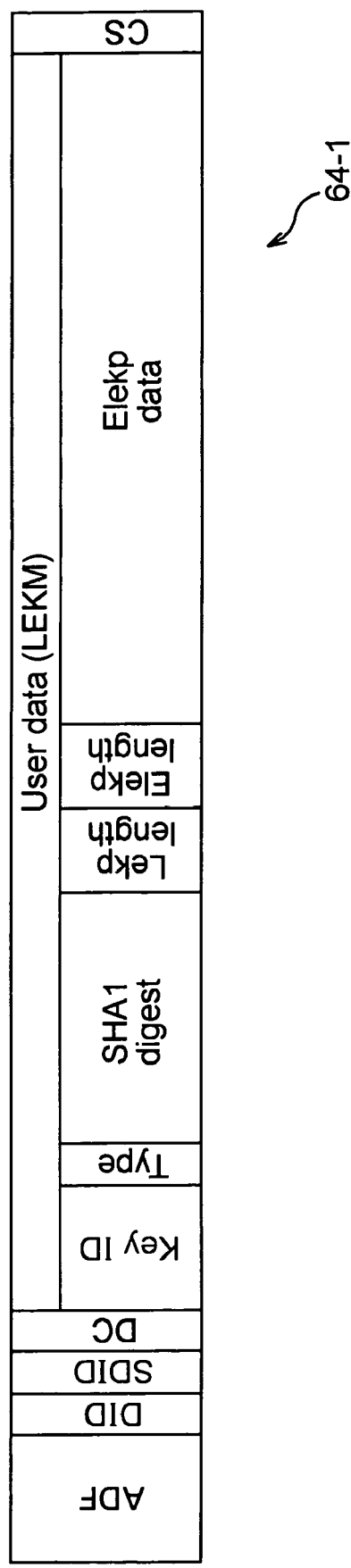
FIG. 2 illustrates an example of the structure of meta data including data used for the encrypting process performed by an encrypting apparatus shown in FIG. 1 and used for the decrypting process performed by a decrypting apparatus.
Figure 3:
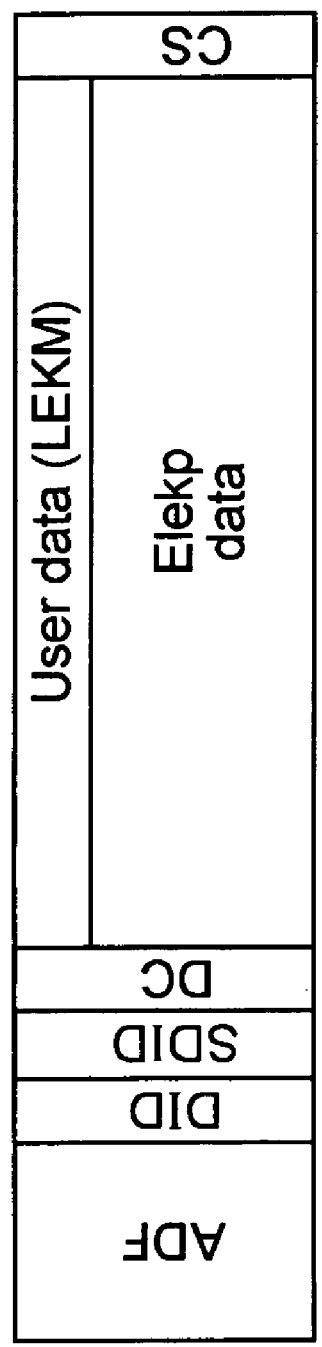
FIG. 3 illustrates an example of the structure of meta data including data used for the encrypting process performed by the encrypting apparatus shown in FIG. 1 and used for the decrypting process performed by the decrypting apparatus.
Figure 4:
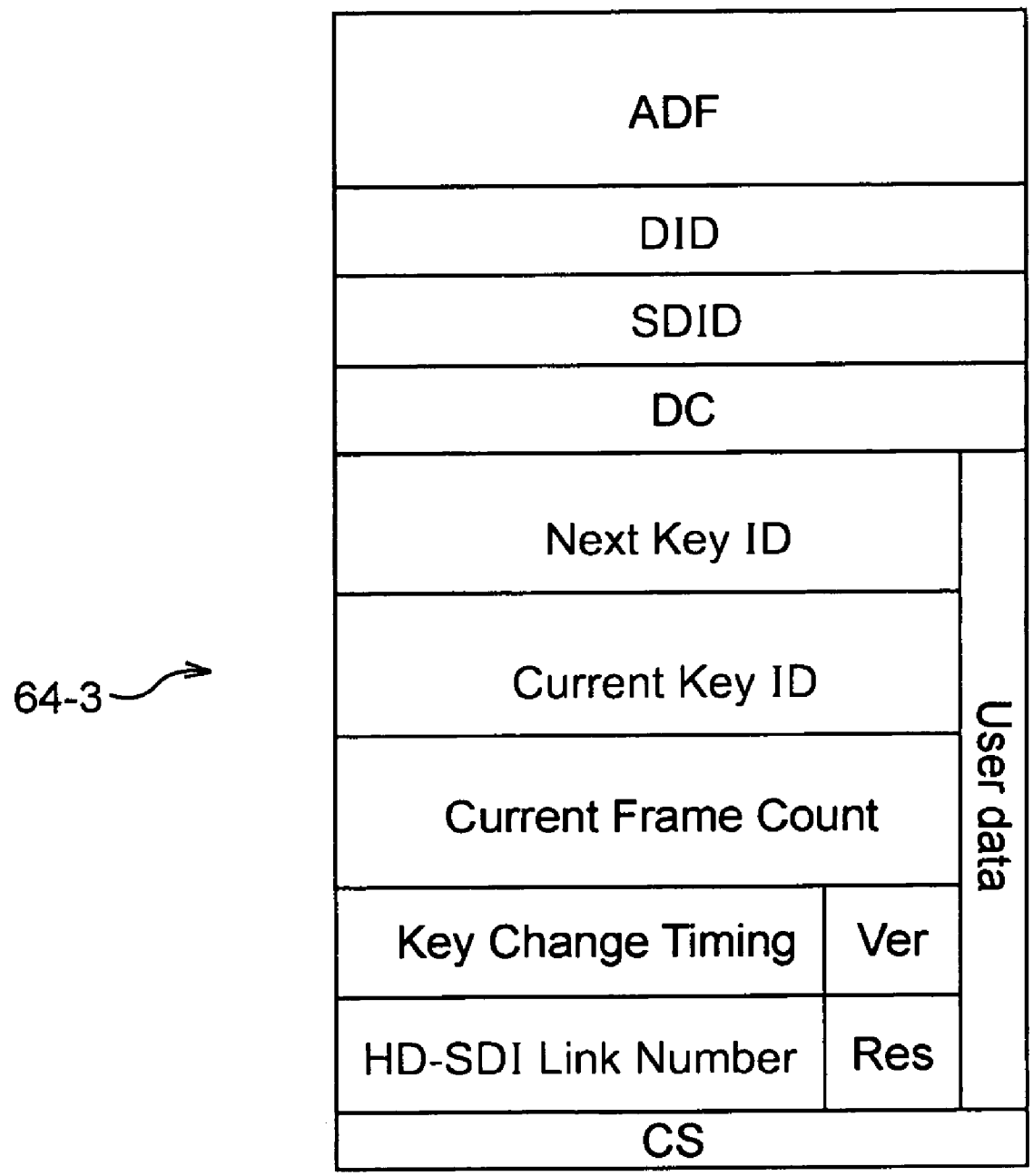
FIG. 4 illustrates an example of the structure of meta data including data used for the encrypting process performed by the encrypting apparatus shown in FIG. 1 and used for the decrypting process performed by the decrypting apparatus.

In the information processing apparatus according to the embodiment of the present invention, each of the plurality of encryption keys includes a key ID for identifying the encryption key and the meta data includes Meta packets 1, 2, and 3 that are generated for each of the plurality of units of data and that comply with Society of Motion Picture and Television Engineers (SMPTE) 291M (e.g., meta data 64-1 representing Meta packet 1 in FIG. 2, meta data 64-2 representing Meta packet 2 in FIG. 3, and meta data 64-3 representing Meta packet 3 in FIG. 4). A predetermined one of the plurality of encryption keys encrypted according to the second encryption method is included in the Meta packets 1 and 2 associated with a predetermined unit of data (e.g., included as Elekp data shown in FIGS. 2 and 3), and at least Next Key ID and Current Key ID are included in the Meta packet 3 associated with each of the units of data.

According to an embodiment of the present invention, an information processing method and an information processing program corresponding a process performed by the above-described meta data acquirer (e.g., the meta data extracting unit 21 in FIG. 1 having the configuration shown in FIG. 5) are provided. The information processing method and the program include the steps of acquiring the meta data, sequentially generating each of the plurality of decryption keys by decrypting one of the plurality of encryption keys contained in the meta data and encrypted using the second encryption method in an order in which the keys are used for encryption (e.g., a process performed by the LEKP restoring unit 102 in FIG. 5), identifying the update timing of each of the decryption keys corresponding to the update timing of one of the encryption keys and issuing an update command at each identified update timing (e.g., a process performed by the key change trigger generating unit 104 in FIG. 5), outputting a first generated decryption key until the update command is issued and outputting a second decryption key generated subsequent to the first decryption key after the update command is issued (e.g., a process performed by the register 105 in FIG. 5), determining whether the second decryption key has been generated before the first decryption key is updated to the second decryption key, monitoring whether the second decryption key is generated if the second decryption key has not been generated yet, and, when the second decryption key is generated, considering the second decryption key generation point in time to be the update timing from the first decryption key to the second decryption key so as to perform control to issue the update command (e.g., a process performed by the key change timing correction unit 111 in FIG. 5 and, more specifically, a process shown in FIG. 9).

Exemplary embodiments of the present invention are described with reference to the accompanying drawings.

FIG. 1 illustrates an exemplary configuration of a system including an encrypting apparatus and a decrypting apparatus (hereinafter referred to as an "encrypting/decrypting system").

In FIG. 1, a block surrounded by a solid line indicates a component of the information processing apparatus, whereas a block surrounded by a dotted line indicates predetermined information. These usages of the solid line and the dotted line apply to all the subsequent drawings.

As shown in FIG. 1, the encrypting/decrypting system includes an encrypting apparatus 1 and a decrypting apparatus 2. The encrypting apparatus 1 encrypts, for example, stream data corresponding to content (such as a movie). The stream data is composed of one or more frames. Hereinafter, the stream data is referred to as "AV data". The decrypting apparatus 2 decrypts the AV data encrypted by the encrypting apparatus 1.

In FIG. 1, the encrypting apparatus 1 encrypts the AV data using the advanced encryption standard (AES) encryption, which is one of the encryption standards of common key cryptosystems. To encrypt the AV data, the encrypting apparatus 1 includes an encrypting unit 11, a meta-data generating unit 12, and an overlapping unit 13. The encrypting unit 11 includes an AES encryption data generating unit 31 and an AV-data encrypting unit 32.

Using a common key 61-E and an AES input 62-E, the AES encryption data generating unit 31 generates data (hereinafter referred to as "AES encryption data") 65 for directly encrypting the AV data. The common key is known as an "AES Key". However, as used herein, the common key is referred to as an "LE Key". The AES encryption data generating unit 31 delivers the AES encryption data 65 to the AV-data encrypting unit 32. The AES input 62-E will be described below.

The AV-data encrypting unit 32 encrypts the AV data using the AES encryption data 65 delivered from the AES encryption data generating unit 31 and delivers the encrypted AV data to the overlapping unit 13. At that time, the AV-data encrypting unit 32 encrypts the AV data using a Frame reset 63-E delivered from the meta-data generating unit 12 on a frame-by-frame basis.

More specifically, in this embodiment, the AV data is, for example, HD-SDI data. The AV data includes one or more frame data items. Each of the frame data item includes data Y indicating the luminance of each of pixels in a frame and data Cb/Cr indicating the color of each of the pixels in the frame. Additionally, for example, each of the LE Key 61-E and the AES input 62-E is 128 bits.

In this case, for example, the AES encryption data generating unit 31 generates the 128-bit AES encryption data 65 from 256-bit input data including the 128-bit LE Key 61-E and the 128-bit AES input 62-E. Thereafter, the AES encryption data generating unit 31 delivers the 128-bit AES encryption data 65 to the AV-data encrypting unit 32. More specifically, for example, the AES encryption data generating unit 31 retrieves every 10 bits from the low order 120 bits of the 128-bit AES encryption data 65 and delivers the retrieved bits to the AV-data encrypting unit 32.

The AV-data encrypting unit 32 separately encrypts every 10 bits of data Y and data Cb/Cr in real time as they arrive so as to deliver the encrypted data Y and data Cb/Cr to the overlapping unit 13.

However, hereinafter, the data Y and the data Cb/Cr are collectively referred to as "AV data", except when it is necessary to distinguish the two.

The meta-data generating unit 12 generates a variety of data required for the encrypting operation of the encrypting unit 11. That is, the meta-data generating unit 12 generates a variety of information required for the decrypting operation of the decrypting apparatus 2. For example, as noted above, the meta-data generating unit 12 generates the LE Key 61-E, the AES input 62-E, and the Frame reset 63-E. Additionally, the meta-data generating unit 12 adds some of the other above-described information items to the LE Key 61-E. Thereafter, the meta-data generating unit 12 encrypts the resultant information item (hereinafter referred to as a "link encryption key payload (LEKP)") using, for example, the RSA (R. Rivest, A. Sharmir, and L. Adelman) 2048-bit encryption (hereinafter simply referred to as an "RSA encryption"), which uses the public key of the decrypting apparatus 2. Hereinafter, the data obtained by encrypting the LEKP using the RSA encryption is referred to as an "ELEKP". That is, the meta-data generating unit 12 generates the ELEKP. Subsequently, in addition to the ELEKP, the meta-data generating unit 12 generates meta data 64 including one of the elements of the AES input 62-E (Le_attribute_data, described below) and delivers the meta data 64 to the overlapping unit 13. The meta data 64 will be described in detail below with reference to FIGS. 2 to 4.

The overlapping unit 13 overlaps or inserts the meta data 64 generated by the meta-data generating unit 12 onto or into the V-Blanking period of the data (hereinafter referred to as "encrypted AV data") obtained by encrypting the HD-SDI AV data by means of the AV-data encrypting unit 32. The AV-data encrypting unit 32 then delivers (transfers) the resultant data (hereinafter referred to as "meta-data overlapped and encrypted AV data") to the decrypting apparatus 2. That is, the meta data 64 is inserted on a frame-by-frame basis.

According to the present embodiment, only one LE Key 61-E is not necessarily used for one AV data item (the entire stream data). The LE Key 61-E is updated as needed. That is, a plurality of the LE Keys 61-E are used for one AV data item. The reason is as follows.

If a malicious third party steals content encrypted with the AES (e.g., the encrypted AV data output from the AV-data encrypting unit 32) and the content is encrypted with one type of the AES key (i.e., LE Key 61-E), the AES key may be directly decrypted. To solve this problem, the meta-data generating unit 12 according to the present embodiment periodically changes (appropriately updates) the key used for the AES encryption (LE Key 61-E). Thus, it is difficult for the malicious third party to directly decrypt the content.

However, according to the present embodiment, as noted above, the meta-data generating unit 12 does not directly transmit the LE Key 61-E to the decrypting apparatus 2. Instead, the meta-data generating unit 12 generates an LEKP including the LE Key 61-E and the additional data and encrypts that LEKP using the RSA encryption to obtain the meta data 64 including the resultant ELEKP. Thereafter, the overlapping unit 13 delivers (transmits) the meta data 64 to the decrypting apparatus 2 together with the encrypted AV data (i.e., the meta-data overlapped and encrypted AV data). That is, according to the present embodiment, the encrypting apparatus 1 encrypts each of a plurality of the LE Keys 61-E using the RSA encryption, separately places the RSA-encrypted LE Keys 61-E in a predetermined frame in the order of generation, and transmits the RSA-encrypted LE Keys 61-E to the decrypting apparatus 2. Therefore, the decrypting apparatus 2 needs to decrypt each of the RSA-encrypted LE Keys 61-E, as will be described below.

Accordingly, the cycle of updating the LE Key 61-E by the meta-data generating unit 12 depends on the processing times of the RSA encrypting operation and the RSA decrypting operation. That is, it follows that the minimal cycle of updating the LE Key 61-E is determined by the processing times of the RSA encrypting operation and the RSA decrypting operation. For example, in the present embodiment, the minimal cycle is determined to be 1 minute.

As noted above, according to this embodiment, only one LE Key 61-E is not used for one AV data item. Instead, a plurality of LE Keys 61-E are used. That is, the LE Key 61-E is updated as needed. In other words, only one LE Key 61-E is not used for all of the frames in one AV data item. Instead, the LE Key 61-E is updated so that different LE Keys 61-E are used for every few frames.

Accordingly, in the present embodiment, every time the meta-data generating unit 12 generates one of the LE Keys 61-E, the meta-data generating unit 12 also generates an identifier (hereinafter referred to as a "Key ID") for identifying the LE Key 61-E. The meta-data generating unit 12 attaches the Key ID to the LE Key 61-E. Thus, the Key ID is included in the meta data 64, as described below.

The LE Key 61-E used for encrypting the AV data needs to be generated before the AV-data encrypting unit 32 starts encrypting the AV data. That is, there is time lag between generating the encrypted AV data and generating the LE Key 61-E used for encrypting the AV data. As a result, the LE Key 61-E contained in the meta data 64 to be overlapped on a predetermined frame (data) (more precisely, contained in an LEKP before the RSA encryption is carried out) is not the one used for encrypting the predetermined frame (data), but the one used for encrypting the frame (data) prior to the predetermined frame (data).

Before an exemplary configuration of the decrypting apparatus 2 is described, the meta data generated by the meta-data generating unit 12 is described in detail with reference to FIGS. 2 to 4.

FIGS. 2 and 3 illustrate the structures of meta data 64-1 and 64-2 including the above-described ELEKP (e.g., the LE Key 61-E encrypted using the RSA), respectively. FIG. 4 illustrates an exemplary structure of meta data 64-3 including the AES input 62-E.

According to the present embodiment, the packet structures of the meta data 64-1, 64-2, and 64-3 comply with the SMPTE 291M standard (society of motion picture and television engineer: proposal SMPTE standard for television-ancillary data packet and space formatting). In general, the packets of the meta data 64-1, 64-2, and 64-3 are referred to as a "Meta packet 1", "Meta packet 2", and "Meta packet 3", respectively. That is, according to the SMPTE 291M standard, for example, as shown in FIGS. 2 to 4, the packet structure include an ancillary data flag field (ADF: "000, 3FF, or 3FF" for "component" and "3FC" for "composite"), a data ID field (DID), a secondary data ID field (SDID), a data count field (DC), a User data field, and a check sum field (CS) in this order. Each of the meta data 64-1, 64-2, and 64-3 has such a packet structure. In this embodiment, the user data field contains, for example, the following information.

The user data field of the meta data 64-1 contains data "Key ID", "Type", "SHA1 digest", "Lekp length", "Elekp length", and "Elekp data". The user data field of the meta data 64-2 contains data "Elekp data".

The following descriptions are made in random order. The Elekp data is data obtained by encrypting the LEKP including the LE Key 61-E with RSA, as described above. That is, the Elekp data is the ELEKP. The Key ID is the identifier of the LE Key 61-E encrypted and included in the ELEKP, as described above. The Elekp length represents the data length of the ELEKP. The Lekp length represents the data length of the LEKP.

The "Type" represents the encryption method used for encrypting the LEKP (the type of encryption algorithm). In this embodiment, a value "0" which represents the RSA encryption is assigned as the Type. The "SHA1 digest" represents the identifier of a public key used when the ELEKP is generated (i.e., when the LEKP is encrypted with the RSA).

Hereinafter, the "User data" of the meta data 64-1 and 64-2, which contain the above-described various data, is referred to as a "Link Encryption Key Message (LEKM)".

In contrast to the LEKM (the User data of the meta data 64-1 and 64-2), the User data of the meta data 64-3 includes data "Next Key ID", "Current Key ID", "Current Frame Count", "key Changing Timing", and "HD-SDI Link Number".

As used herein, the frame into which the target meta data 64-3 is inserted is referred to as a "target frame". Additionally, the time immediately before the target frame (data corresponding to the target frame in the AV data) is about to be encrypted is referred to as a "current time". The LE Key 61-E at the current time is referred to as a "Current LE Key 61-E". An LE Key 61-E that is generated immediately after the Current LE Key 61-E is generated (i.e., an LE Key 61-E that is generated by the meta-data generating unit 12 at the next update timing) is referred to as a "Next LE Key 61-E". In contrast, an LE Key 61-E that is generated immediately before the Current LE Key 61-E is generated (i.e., an LE Key 61-E that is generated by the meta-data generating unit 12 at the immediately prior update timing) is referred to as a "Previous LE Key 61-E".

In this case, the meta data 64-3, which is inserted into the target frame, includes data "Next Key ID", "Current Key ID", "Current Frame Count", "Key Changing Timing", and "HD-SDI Link Number" containing the following information.

The Next Key ID contains the Key ID of the Next LE Key 61-E, and the "Current Key ID" contains the Key ID of the Current LE Key 61-E.

The Current Frame Count contains the ordinal number of the target frame from the current frame when the Previous LE Key 61-E is changed to the Current LE Key 61-E (hereinafter, such a point in time is referred to as a "Key Change Timing"). It is noted that the ordinal number of the current frame is "0".

The Key Changing Timing contains one of the values of 2'b11, 2'b10, 2'b01, and 2'b00. These values indicate which frame is the frame at the next Key Changing Timing. More specifically, the value 2'b11 (=3) indicates that the Key Changing Timing occurs after three frames subsequent to the target frame. The value 2'b10 (=2) indicates that the Key Changing Timing occurs at a frame that is two frames subsequent to the target frame. The value 2'b01 (=1) indicates that the Key Changing Timing occurs at a frame that is one frame subsequent to the target frame (i.e., the next frame). The value 2'b00 (=0) indicates that the Key Changing Timing occurs in the target frame.

The HD-SDI Link Number indicates the transmission mode of an HD-SDI signal between the encrypting apparatus 1 and the decrypting apparatus 2 (in this embodiment, the transmission mode of the meta-data overlapped and encrypted AV data). That is, for example, if a value of "0" is assigned to the HD-SDI Link Number, the Link-A of a single link (a transmission mode using one HD-SDI interface) or a dual link (a transmission mode using two HD-SDI interfaces) is selected. If a value of "1" is assigned to the "HD-SDI Link Number", the Link-B of a dual link is selected.

The LE Key 61-E contained in the ELEKP (more precisely, the LEKP before encryption) of the meta data 64-1 and 64-2 inserted into the target frame is used for encrypting the frames subsequent to the target frame. That is, the LE Key 61-E used for the target frame is included in the ELEKP (more precisely, the LEKP before encryption) of the meta data 64-1 and 64-2 inserted into a previous frame of the target frame.

Referring back to FIG. 1, as described above, in this embodiment, the encrypted AV data in which the meta data 64-1 to 64-3 are overlapped (i.e., the meta-data overlapped and encrypted AV data) is generated by the encrypting apparatus 1 and is transmitted (delivered) to the decrypting apparatus 2.

In the example shown in FIG. 1, the decrypting apparatus 2 having such a structure includes a meta data extracting unit 21 and a decrypting unit 22.

The meta data extracting unit 21 extracts information such as the meta data 64 (in this embodiment, the meta data 64-1 to 64-3) from the meta-data overlapped and encrypted AV data delivered from the encrypting apparatus 1. Thereafter, the meta data extracting unit 21 generates an LE Key 61-D, an AES input 62-D, and a Frame reset 63-D and delivers these data to the decrypting unit 22. The LE Key 61-D, the AES input 62-D, and the Frame reset 63-D are restored ones of the LE Key 61-E, the AES input 62-E, and the Frame reset 63-E that have been used for encrypting the encrypted AV data in the encrypting apparatus 1, respectively. Accordingly, from a different viewpoint, the meta data extracting unit 21 restores the LE Key 61-E, the AES input 62-E, and the Frame reset 63-E and delivers the restored ones to the decrypting unit 22.

The meta data extracting unit 21 is described in detail below with reference to FIG. 5.

In the example shown in FIG. 1, the decrypting unit 22 includes an AES decryption data generating unit 41 and an AV-data decrypting unit 42.

The AES decryption data generating unit 41 generates data 66 for directly decrypting the encrypted AV data (AV data that was encrypted using the AES) using the LE Key 61-D and the AES input 62-D delivered from the meta data extracting unit 21. Hereinafter, the data 66 is referred to as "AES decryption data 66". The AES decryption data generating unit 41 then delivers the AES decryption data 66 to the AV-data decrypting unit 42. That is, the AES decryption data 66 is decryption data corresponding to the AES encryption data 65.

The AV-data decrypting unit 42 decrypts the encrypted AV data using the AES decryption data 66 delivered from the AES decryption data generating unit 41. The AV-data decrypting unit 42 then externally outputs the resultant AV data (restored AV data). At that time, the AV-data decrypting unit 42 decrypts the encrypted AV data using the Frame reset 63-D delivered from the meta data extracting unit 21 on a frame-by-frame basis.

The meta data extracting unit 21 is described in detail next with reference to FIG. 5. FIG. 5 illustrates an exemplary configuration of the meta data extracting unit 21 in detail.

Figure 5:
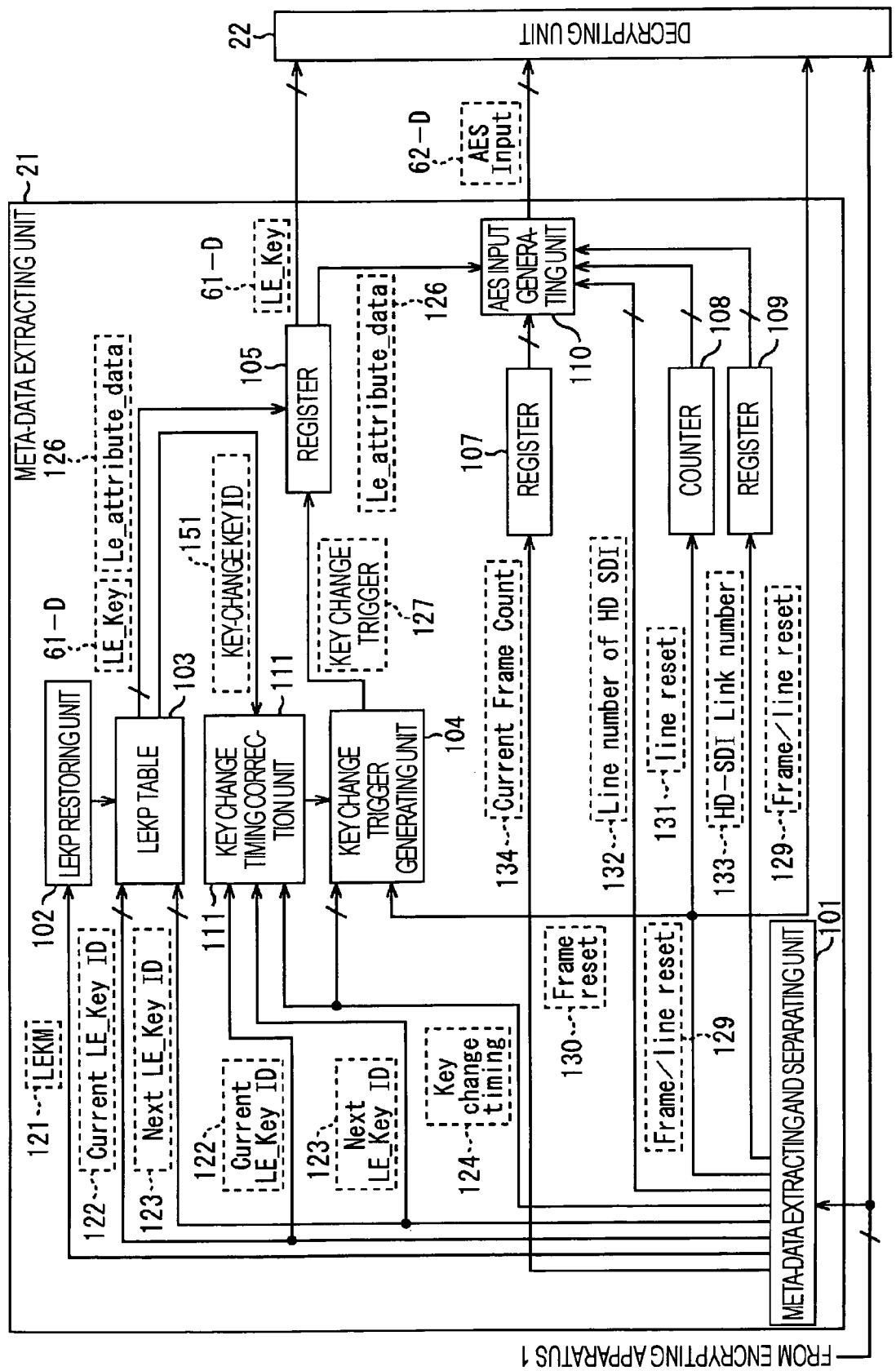
FIG. 5 is a block diagram of the detailed configuration of a meta-data extracting unit of the decrypting apparatus shown in FIG. 1.

As shown in FIG. 5, the meta data extracting unit 21 includes components from a meta data extracting and separating unit 101 to a key change timing correction unit 111.

The meta data extracting and separating unit 101 extracts information such as the meta data 64 (in this embodiment, the meta data 64-1 to 64-3 shown in FIGS. 2 to 4) from the meta-data overlapped and encrypted AV data delivered from the encrypting apparatus 1. Additionally, the meta data extracting and separating unit 101 separates a variety of information included in the meta data 64.

More specifically, for example, as shown in FIG. 5, the meta data extracting and separating unit 101 extracts or separates an LEKM 121, a Current LE_key ID 122, a Next LE_key ID 123, a Key Change Timing 124, a Frame/line reset 129, an HD-SDI Link number 133, and a Current Frame Count 134.

The Frame/line reset 129 includes a Frame reset 130 and a line reset 131. As described above, the LEKM 121 is a value assigned to the User data of the meta data 64-1 and the meta data 64-2. The Current LE_key ID 122 is a value assigned to the Current LE_key ID of the meta data 64-3. The Next LE_key ID 123 is a value assigned to the Next LE_key ID of the meta data 64-3. The Key Change Timing 124 is a value assigned to the Key Change Timing of the meta data 64-3. The HD-SDI Link number 133 is a value assigned to the HD-SDI Link number of the meta data 64-3. The Current Frame Count 134 is a value assigned to the Current Frame Count of the meta data 64-3.

The LEKM 121 is delivered to an LEKP restoring unit 102. The Current LE_key ID 122 and the Next LE_key ID 123 are delivered to an LEKP table 103 and the key change timing correction unit 111. The Key Change Timing 124 is delivered to a key change trigger generating unit 104 and the key change timing correction unit 111. The Current Frame Count 134 is delivered to a register 107. The Frame reset 130 is delivered to the key change trigger generating unit 104. The line reset 131 is delivered to a counter 108. The Frame/line reset 129 including the Frame reset 130 and the line reset 131 is delivered to the decrypting unit 22. The Frame/line reset 129 corresponds to the Frame reset 63-D shown in FIG. 1. The HD-SDI Link number 133 is delivered to a register 109.

The LEKP restoring unit 102 restores the LEKP from the LEKM 121. The LEKP is stored in the LEKP table 103 in association with the Key ID of the LEKP. That is, as described above, the LEKM 121 is a value assigned to the User Data of the meta data 64-1 shown in FIG. 2 and the meta data 64-2 shown in FIG. 3. The User Data includes the ELEKP (indicated as "Elekp data" in FIGS. 2 and 3). As described above, the ELEKP is data obtained by encrypting the LEKP using the RSA. Accordingly, the LEKP restoring unit 102 encrypts the ELEKP contained in the LEKM 121 using a pair key (private key) of the public key for generation of the ELEKP. The LEKP restoring unit 102 then stores the obtained LEKP (restored LEKP) in the LEKP table 103 in association with the Key ID of the LEKP.

Thus, one or more LEKPs are stored in the LEKP table 103 in association with the Key ID that identifies the LEKP. As described above, the LEKP stored in the LEKP table 103 includes the LE Key 61-D (the restored LE Key 61-E shown in FIG. 1) and several additional information items. According to this embodiment, one of the additional information item is Le_attribute_data 126, which is one of the elements of the AES input 62-E shown in FIG. 1. Therefore, upon receiving a request from a register 105 (at a predetermined time after a key change command, which is described below, is received), the LEKP table 103 stores the LE Key 61-D (hereinafter referred to as a "Current LE Key 61-D") contained in the LEKP having the Key ID that is equal to the Current LE_key ID 122 and the Le_attribute_data 126 (hereinafter referred to as a "Current Le_attribute_data 126") in the register 105. Alternatively, the LEKP table 103 stores the LE Key 61-D (hereinafter referred to as a "Next LE Key 61-D") contained in the LEKP having the Key ID that is equal to the Next LE_key ID 123 and the Le_attribute_data 126 (hereinafter referred to as a "Next Le_attribute_data 126") in the register 105.

Every time the Frame reset 130 is delivered, the key change trigger generating unit 104 delivers a key change trigger 127 to the register 105. More specifically, for example, examples of the key change trigger 127 include a key-change enable command and a key-change disable command. One of these two commands is delivered to the register 105. In this case, the key change trigger generating unit 104 monitors the value of the Key Change Timing 124. When the value is equal to 2'b00 (=0), that is, when the target frame is at the Key Change Timing, the key change trigger generating unit 104 delivers the key-change enable command to the register 105 as the key change trigger 127. In contrast, when the value is other than 2'b00 (=0), the key change trigger generating unit 104 delivers the key-change disable command to the register 105 as the key change trigger 127.

In general, the register 105 stores the Current LE Key 61-D and the Current Le_attribute_data 126.

When receiving the key-change disable command as the key change trigger 127, the register 105 delivers the Current LE Key 61-D to the decrypting unit 22 and delivers the Current Le_attribute_data 126 to an AES input generating unit 110. Thus, the decrypting unit 22 decrypts the target frame (frame data encrypted with the AES) using the Current LE Key 61-D.

In contrast, upon receiving the key-change enable command as the key change trigger 127, the register 105 requests the update of the stored information to the LEKP table 103. Subsequently, as noted above, the LEKP table 103 stores the Next LE Key 61-D and the Next Le_attribute_data 126 at the point in time when the request is received from the register 105 in the register 105. That is, the Next LE Key 61-D and the Next Le_attribute_data 126 are stored in the register 105 as the new Current LE Key 61-D and Current Le_attribute_data 126 after the key change is performed. Thereafter, the Current LE Key 61-D (that was the Next LE Key 61-D) is delivered to the decrypting unit 22, and the Current Le_attribute_data 126 (that was the Next Le_attribute_data 126) is delivered to the AES input generating unit 110. Thus, in the decrypting unit 22, the LE Key 61-D for decryption is updated from the Current LE Key 61-D to the Next LE Key 61-D (i.e., the new Current LE Key 61-D). Thereafter, the decrypting unit 22 decrypts the target frame (frame data encrypted with the AES).

The register 107 holds the Current Frame Count 134 and delivers the Current Frame Count 134 to the AES input generating unit 110 as needed.

Every time the counter 108 receives the line reset 131, the counter 108 increments the count value by one and delivers the count value to the AES input generating unit 110.

The register 109 holds the HD-SDI Link number 133 and delivers the HD-SDI Link number 133 to the AES input generating unit 110 as needed.

Thus, the AES input generating unit 110 receives the Le_attribute_data 126 from the register 105, the Current Frame Count 134 from the register 107, a Line number of HD SDI 132 from the meta data extracting and separating unit 101, the count value from the counter 108, and the HD-SDI Link number 133 from the register 109. Thereafter, the AES input generating unit 110 generates an AES input 62-D including at least the Le_attribute_data 126, the Current Frame Count 134, the Line number of HD SDI 132, the count value from the counter 108, and the HD-SDI Link number 133. That is, the AES input generating unit 110 restores the AES input 62-E shown in FIG. 1 and delivers the AES input 62-D to the decrypting unit 22.

The key change timing correction unit 111 monitors a Key ID 151 of the LE Key 61-D stored in the LEKP table 103 (i.e., a key ID 151 of the LE Key 61-D that is to be changed at the next Key Change Timing and, hereinafter, is referred to as a "key-change Key ID 151"), the Current LE_key ID 122, and the Next LE_key ID 123 so as to determine whether the process of decrypting the LE Key 61-D performed by the LEPK restoring unit 102 has been completed in time. If the key change timing correction unit 111 determines that the process of decrypting the LE Key 61-D performed by the LEPK restoring unit 102 has not been completed in time, the key change timing correction unit 111 outputs a correction command of Key Change Timing to the key change trigger generating unit 104 when the LEPK restoring unit 102 has completed the decryption of the next LE Key 61-D. Thus, the key change trigger generating unit 104 corrects the Key Change Timing, that is, the key change trigger generating unit 104 forcibly changes the key change trigger 127 to the key change command.

The details of the key change timing correction unit 111 (including the operation thereof) are described next with reference to FIGS. 6 to 9.

Figure 6:
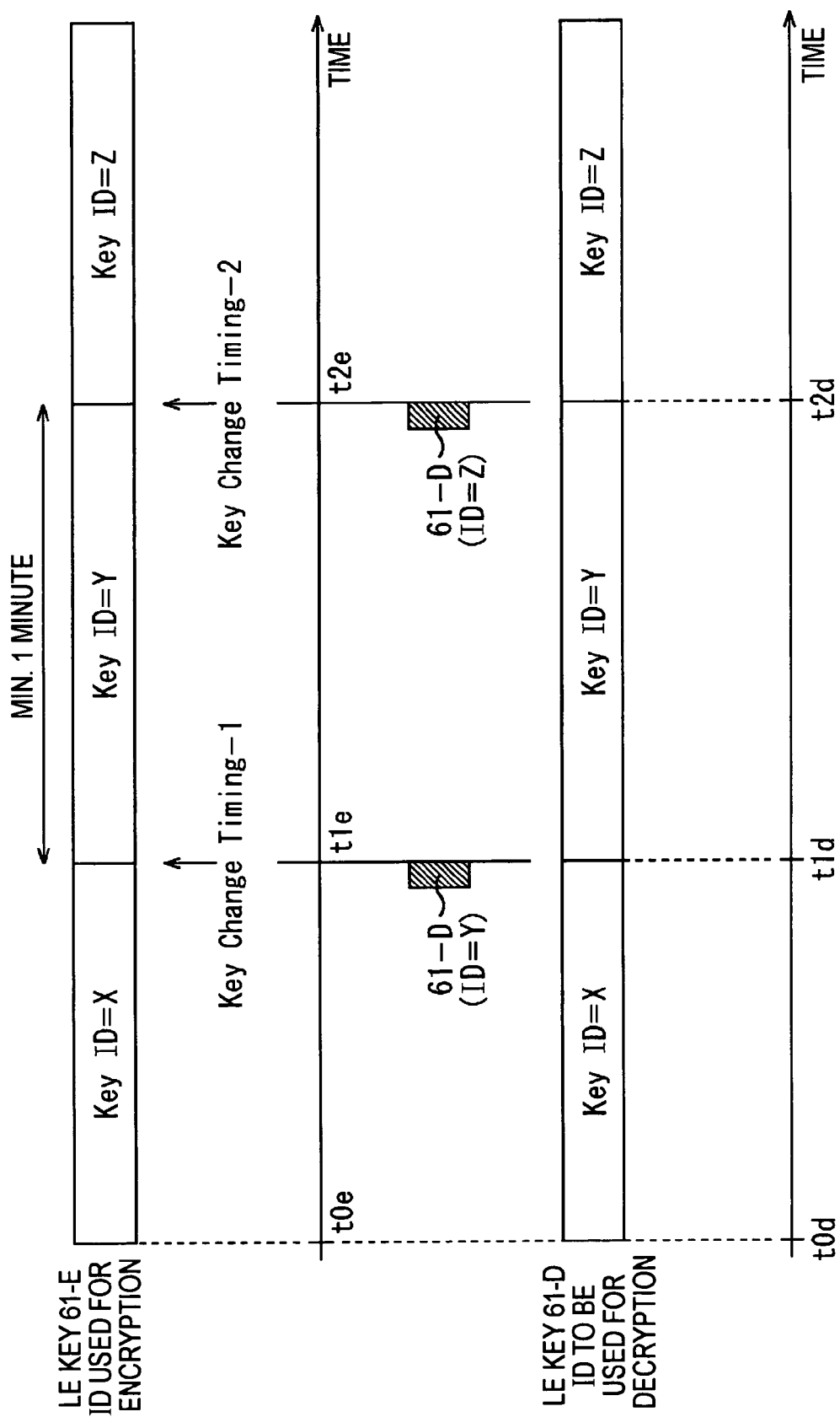
FIG. 6 illustrates an example of the normal process of updating an LE Key (AES key) used for decrypting the encrypted AV data.

That is, according to the present embodiment, as described above, the LE Key (AES key) 61-E used for encrypting AV data with the AES is updated at a predetermined update period (the minimum update period is 1 minute). An example of the update process is illustrated in FIG. 6. That is, in the example shown in FIG. 6, the AV data is encrypted using the LE Key 61-E having the Key ID=X between a time t0e and a time t1e, which is a Key change Timing-1. After the time t1e has lapsed, the AV data is encrypted using the LE Key 61-E having the Key ID=Y between a time t1e and a time t2e, which is a Key change Timing-2. After the time t2e has lapsed, the AV data is encrypted using the LE Key 61-E having the Key ID=Z.

In this case, if, in the decrypting apparatus 2, the encrypted AV data is decrypted using the LE Key 61-D having Key ID=X from a time t0d, the LE Key 61-D having Key ID=Y is, in general, prepared by a time t1d, which is the Key Change Timing-1. That is, the LE Key 61-D having Key ID=Y is stored in the LEKP table 103 shown in FIG. 5 as the Next LE Key 61-D by the time t1d. Since the LE Key 61-D having Key ID=X is output from the register 105 to the decrypting unit 22 until the time t1d is reached, the LE Key 61-D having Key ID=X is used in the decrypting operation performed by the decrypting unit 22.

When the time t1d is reached, the key change trigger generating unit 104 provides the key change command to the register 105. Thus, the register 105 requests the LEKP table 103 to update the information stored in the register 105. Subsequently, the LEKP table 103 stores the Next LE Key 61-D at the request time sent from the register 105, namely, the LE Key 61-D having Key ID=Y in the register 105. Accordingly, after this point in time, the LE Key 61-D having Key ID=Y is output to the decrypting unit 22. That is, the LE Key 61-D having Key ID=Y is used in the decrypting operation performed by the decrypting unit 22 from the time t1d to a time t2d, which is the next Key Change Timing-2.

Additionally, in general, by the time t2d, which is the next Key Change Timing-2, the LE Key 61-D having key ID=Z is prepared. That is, the LE Key 61-D having key ID=Z is stored in the LEKP table 103 shown in FIG. 5 as the Next LE Key 61-D.

Subsequently, when the time t2d is reached, the key change trigger generating unit 104 provides the key change command to the register 105. Thus, the register 105 requests the LEKP table 103 to update the information stored in the register 105. Subsequently, the LEKP table 103 stores the Next LE Key 61-D at the request time sent from the register 105, namely, the LE Key 61-D having Key ID=Z in the register 105. Accordingly, after this point in time, the LE Key 61-D having Key ID=Z is output to the decrypting unit 22. That is, the LE Key 61-D having Key ID=Z is used in the decrypting operation performed by the decrypting unit 22 after the time t2d.

Figure 7:
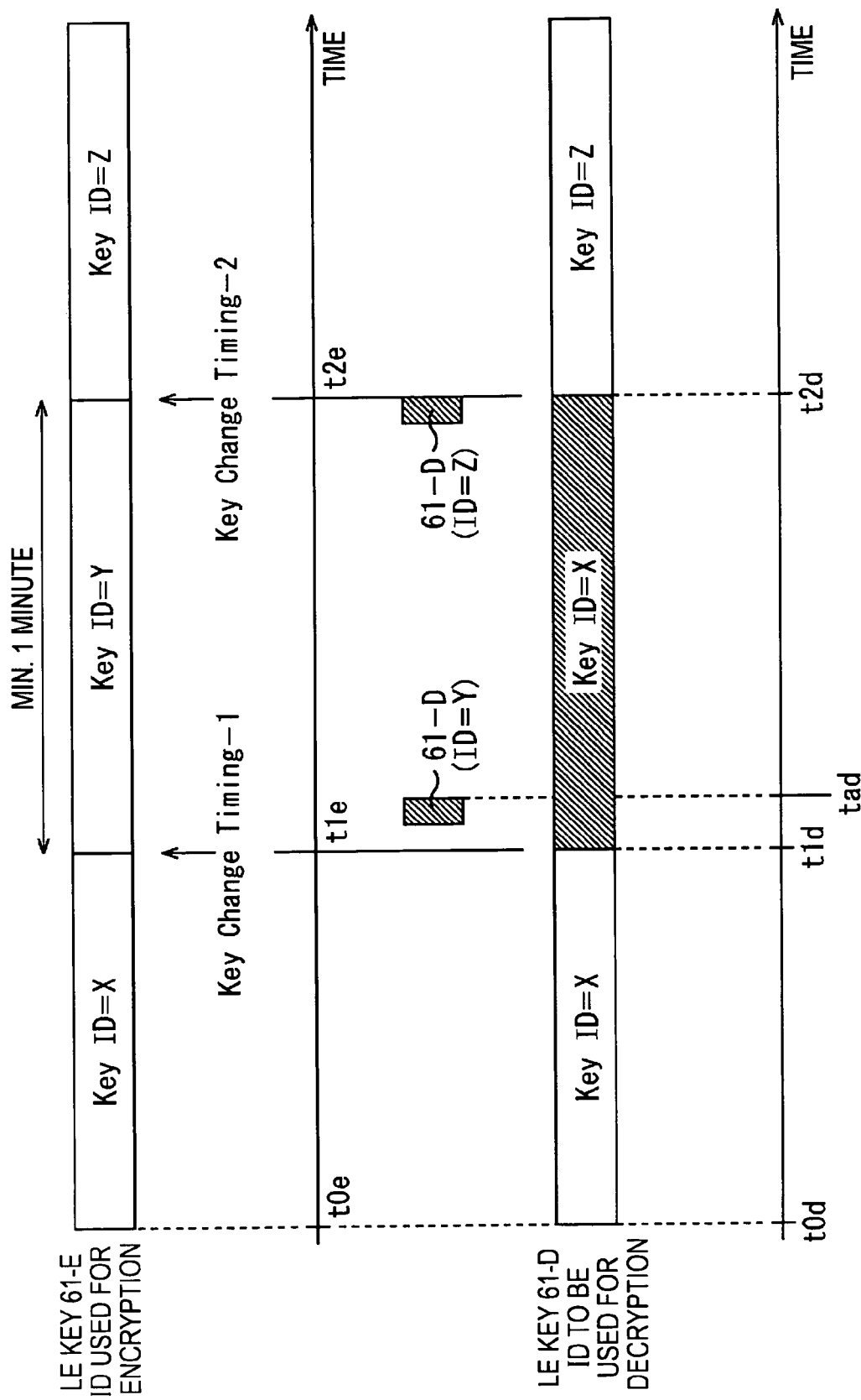
FIG. 7 illustrates an example of the abnormal process of updating an LE Key (AES key) used for decrypting the encrypted AV data.

However, suppose that, as shown in FIG. 7, the decrypting operation performed by the LEPK restoring unit 102 is delayed, and therefore, the LE Key 61-D having Key ID=Y cannot be not prepared by the time t1d, which is Key Change Timing-1, that is, in the example shown in FIG. 7, the LE Key 61-D having Key ID=Y is prepared at a time tad, which is a time after the time t1d.

In this case, since the LE Key 61-D having Key ID=Y is not prepared by the time t1d, it follows that the LE Key 61-D having Key ID=Y has not been stored in the LEKP table 103 shown in FIG. 5 yet. Therefore, the LE Key 61-D having Key ID=X still remains in the LEKP table 103 as the Next LE Key 61-D.

When the time t1d is reached with this state, the key change trigger generating unit 104 provides a key change command to the register 105. Thus, the register 105 requests the LEKP table 103 to update the information stored in the register 105. Subsequently, the LEKP table 103 stores the Next LE Key 61-D at the request time sent from the register 105, namely, the LE Key 61-D having Key ID=X in the register 105. Therefore, even after that point in time, the LE Key 61-D having Key ID=X continues to be output to the decrypting unit 22. As a result, after the time t1d, the decrypting unit 22 decrypts the encrypted AV data (frame), which has been encrypted using the LE Key 61-E of Key ID=Y, using the different AES key LE Key 61-D of Key ID=X. Thus, the decrypting unit 22 cannot properly decrypt the encrypted AV data.

This problem continues until at least the time t2d, which is the next Key Change Timing-2.

Figure 8:
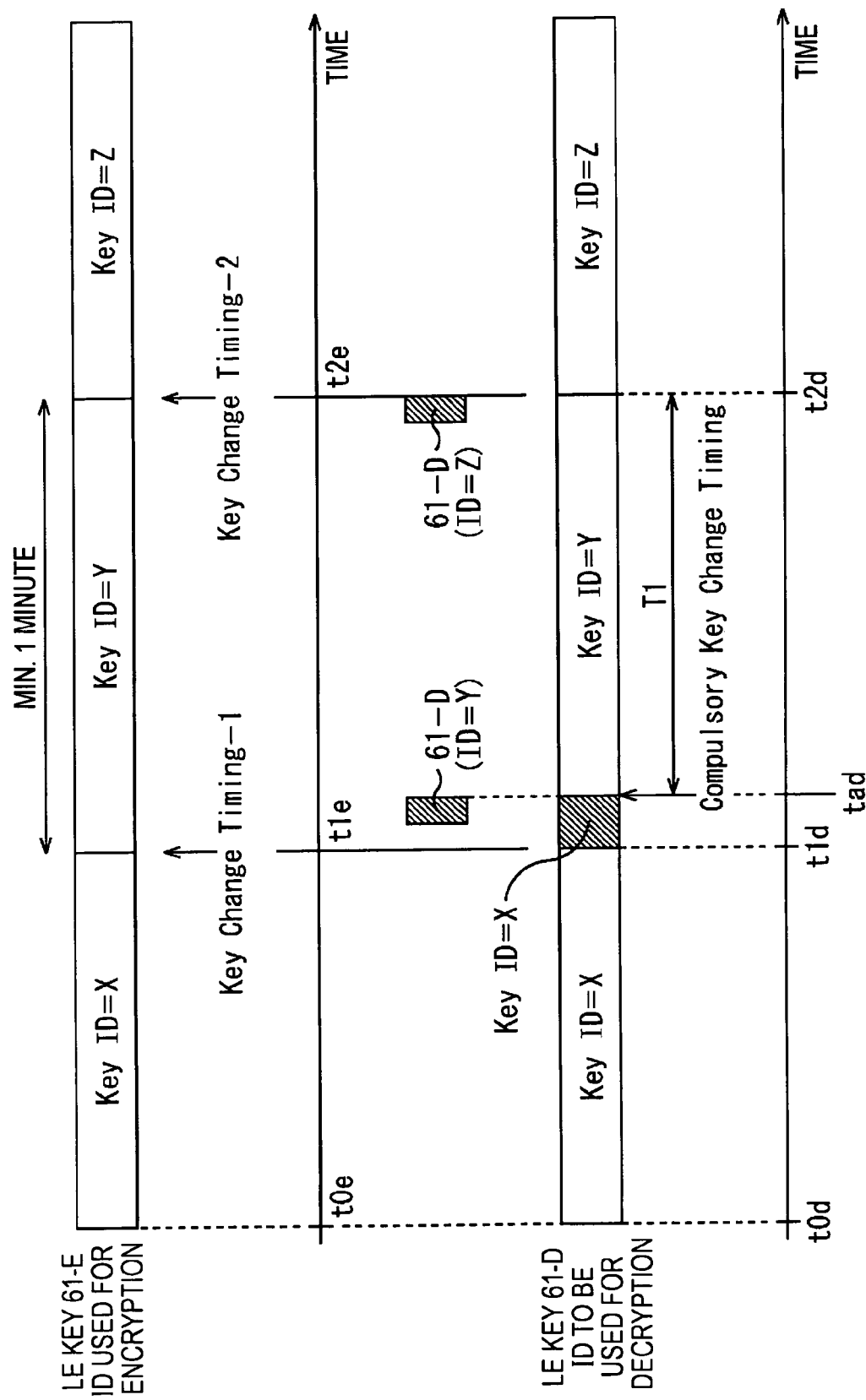
FIG. 8 is a diagram illustrating a method for solving the abnormal process shown in FIG. 7 according to an embodiment of the present invention.

Accordingly, to minimize this problem, the present inventor has discovered the following method, as shown in FIG. 8. That is, in this method, the time at which the AES key that has not been decrypted in time (by the time t1d, which is Key Change Timing-1, in the example shown in FIG. 8), that is, the time at which a proper AES key to be used by the decrypting unit 22 (i.e., the time tad in the example shown in FIG. 8) arrives is determined to be a compulsory Key Change Timing (hereinafter referred to as a "Compulsory Key Change Timing"). That is, according to the present embodiment, that time is a time at which the RSA decrypting operation performed by the LEPK restoring unit 102 shown in FIG. 5 is completed and the resultant LE Key 61-D having Key ID=Y is stored in the LEKP table 103 as the Next LE Key 61-D.

More specifically, in the case shown in FIG. 8 where the meta data extracting unit 21 shown in FIG. 5 according to this embodiment is employed, a method that can realize the following operations is an example of the method of this embodiment of the present invention.

That is, in the example shown in FIG. 8, the key change timing correction unit 111 determines whether the LEPK restoring unit 102 has completed the RSA decryption process by the time t1d, which is Key Change Timing-1. That is, the key change timing correction unit 111 determines whether the AES key stored in the LEKP table 103 as the LE Key 61-D is a proper key (i.e., the LE Key 61-D having Key ID=Y). This determination is made by comparing the Current LE_key ID 122 and the Next LE_key ID 123 (contained in the meta data 64-3) sent from the meta data extracting and separating unit 101 with the key-change Key ID 151 from the LEKP table 103.

That is, if, at a time immediately before the time t1d, the Next LE_key ID 123 is equal to the key-change Key ID 151 with the value "Y", it is determined that the RSA decryption has been completed in time.

However, in the example shown in FIG. 8, since, at the time immediately before the time t1d, the Current LE_key ID 122 is equal to the key-change Key ID 151 with the value "X", it is determined that the RSA decryption has not been completed in time. In this case, the key change timing correction unit 111 asserts an RSA signal delay flag (sets the RSA signal delay flag to ON).

When the RSA signal delay flag is asserted and when the time tad at which the Current LE_key ID 122 is made equal to the key-change Key ID 151 with a value Y is reached, that is, when the time tad at which the LE Key 61-D having Key ID=Y is stored in the LEKP table 103 as the Next LE Key 61-D is reached, the key change timing correction unit 111 determines that the LE Key 61-D having Key ID=Y is an AES key prepared for Key Change Timing-1, not for Key Change Timing-2. Subsequently, to forcibly update the AES key, the key change timing correction unit 111 determines the time tad at which the proper AES key arrives to be Compulsory Key Change Timing and outputs a correction command of Key Change Timing to the key change trigger generating unit 104.

Thereafter, the key change trigger generating unit 104 forcibly changes the key change trigger 127 to a key change command.

Thus, the register 105 requests the LEKP table 103 to update the information stored in the register 105. Subsequently, the LEKP table 103 stores the Next LE Key 61-D at the request time sent from the register 105, namely, the proper LE Key 61-D (the LE Key 61-D having Key ID=Y in the example shown in FIG. 8) in the register 105. Therefore, after the Compulsory Key Change Timing (the time tad in the example shown in FIG. 8), the proper AES key (the LE Key 61-D having Key ID=Y in the example shown in FIG. 8) is output from the register 105 to the decrypting unit 22.

A method that can realize the above-described processes is an example of the method according to this embodiment of the present invention.

By carrying out the above-described processes, from the time tad at which the proper AES key arrives, the decrypting unit 22 can perform a decrypting operation using that proper key (the LE Key 61-D having Key ID=Y in the example shown in FIG. 8) so that the adverse effect caused by delay of the RSA decryption can be minimized. That is, if the above-described method according to this embodiment of the present invention is not applied (e.g., in the case shown in FIG. 7), the adverse effect caused by the delay of the RSA decryption continues to be present between the time t1d and the time t2d. In contrast, when the above-described method according to an embodiment of the present invention is applied (i.e., in the case shown in FIG. 8), the adverse effect caused by the delay of the RSA decryption continues to be present between the time t1d and the time tad. Therefore, the adverse effect caused by the delay of the RSA decryption can be reduced by the time T1 shown in FIG. 8.

Figure 9:
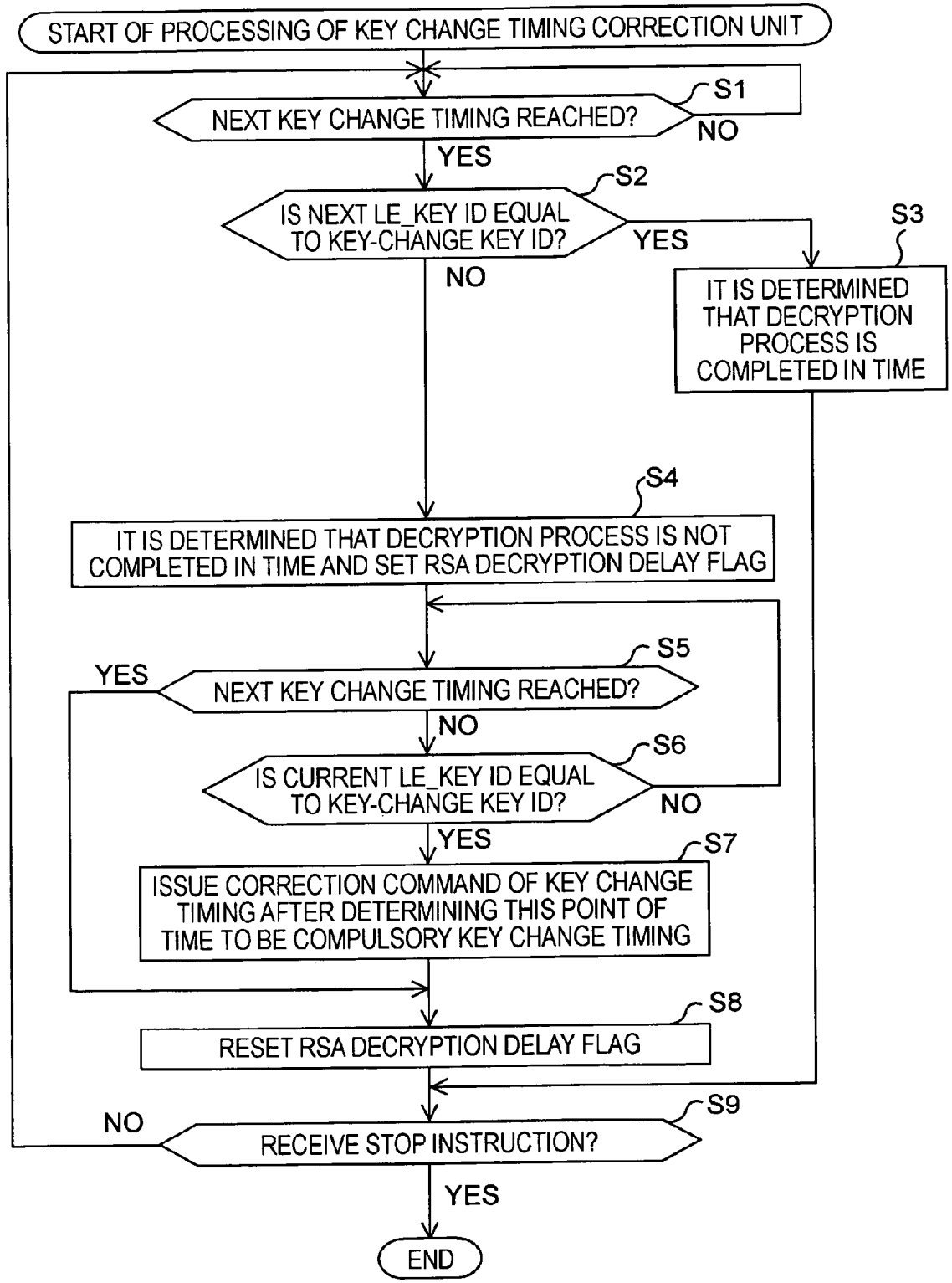
FIG. 9 is a flow chart illustrating an example of the operation performed by the key change timing correction unit shown in FIG. 5 to which the method shown in FIG. 8 is applied.

More generally, a method that can realize the processes according to a flow chart shown in FIG. 9 is an example of the method according to this embodiment of the present invention. That is, FIG. 9 illustrates an example of a process that realizes this method, namely, a flow chart of an exemplary operation of the key change timing correction unit 111.

At step S1, the key change timing correction unit 111 determines whether the next Key Change Timing (more precisely, a time immediately before the next Key Change Timing) has been reached or not.

If, at step S1, it is determined that the next Key Change Timing has not been reached, the process returns to step S1, where it is determined whether the next Key Change Timing is reached again.

However, if, at step S1, it is determined that the next Key Change Timing has been reached, the process proceeds to step S2.

At step S2, the key change timing correction unit 111 determines whether the Next LE_key ID 123 is equal to the key-change Key ID 151.

If, at step S2, it is determined that the Next LE_key ID 123 is equal to the key-change Key ID 151, the key change timing correction unit 111, at step S3, determines that the process of decrypting the LE Key 61-D performed by the LEPK restoring unit 102 has been completed in time. Thereafter, the process proceeds to step S9. A description of processes performed subsequent to step S9 is provided later.

In contrast, if, at step S2, it is determined that the Next LE_key ID 123 is not equal to the key-change Key ID 151, the process proceeds to step S4. At step S4, the key change timing correction unit 111 determines that the process of decrypting the LE Key 61-D performed by the LEPK restoring unit 102 has not been completed in time. Thereafter, the key change timing correction unit 111 sets the above-described RSA decryption flag to ON (i.e., the key change timing correction unit 111 asserts the RSA decryption flag).

At step S5, the key change timing correction unit 111 determines whether the next Key Change Timing (more precisely, a time immediately before the next Key Change Timing) has been reached or not.

If, at step S5, it is determined that the next Key Change Timing has been reached, the process returns to step S8. A description of processes performed subsequent to step S8 is provided later.

However, if, at step S5, it is determined that the next Key Change Timing has not been reached, the process returns to step S6.

At step S6, the key change timing correction unit 111 determines whether the Current LE_key ID 122 is equal to the key-change Key ID 151. That is, as described above, by determining at step S6 whether the Current LE_key ID 122 is equal to the key-change Key ID 151, it is determined whether the next LE Key 61-D, which is the LE Key 61-D used for decryption, is prepared (i.e., whether the next LE Key 61-D is stored in the LEKP table 103 as the Next LE Key 61-D).

If, at step S6, it is determined that the Current LE_key ID 122 is not equal to the key-change Key ID 151, that is, if it is determined that the next LE Key 61-D is not prepared as the LE Key 61-D for decryption, the process returns to step S5. Thereafter, the processes subsequent to step S5 are repeatedly carried out. That is, until the next LE Key 61-D serving as the LE Key 61-D for decryption is prepared, step S5 "NO" and step S6 "NO" are looped. However, the loop continues until the next Key Change Timing occurs at most. As noted above, when the next Key Change Timing occurs, the process proceeds to step S8, which is described below.

Additionally, if the next LE Key 61-D is prepared as the LE Key 61-D used for decryption before the next Key Change Timing occurs, it is determined at step S6 that the Current LE_key ID 122 is equal to the key-change Key ID 151, and therefore, the process proceeds to step S7.

At step S7, the key change timing correction unit 111 determines, for example, the start point in time of step S7 to be Compulsory Key Change Timing and issues a correction command of Key Change Timing to the key change trigger generating unit 104.

Thereafter, as described above, the key change trigger generating unit 104 forcibly changes the key change trigger 127 to a key change command. Thus, the register 105 requests the LEKP table 103 to update the information stored in the register 105. Subsequently, the LEKP table 103 stores the Next LE Key 61-D at the request time sent from the register 105, namely, the proper LE Key 61-D in the register 105. Therefore, after the Compulsory Key Change Timing, the proper AES key is output from the register 105 to the decrypting unit 22.

If step S7 is completed or it is determined at step S5 that the test result is "YES", the process proceeds to step S8.

At step S8, the key change timing correction unit 111 resets the RSA decryption flag to OFF (i.e., releases the asserted state).

At step S9, the key change timing correction unit 111 determines whether the key change timing correction unit 111 has received an instruction to stop the processing.

If, at step S9, it is determined that the key change timing correction unit 111 has not received the instruction to stop the processing, the process returns to step S1. Thereafter, the processes subsequent to step S1 are repeated.

However, if, at step S9, it is determined that the key change timing correction unit 111 has received the instruction to stop the processing, the processing of the key change timing correction unit 111 is completed.

So far, the decrypting apparatus 2 having a configuration shown in FIG. 1 (the decrypting apparatus 2 including the meta data extracting unit 21 having a configuration shown in FIG. 5) has been described as an information processing apparatus according to an embodiment of the present invention.

However, the information processing apparatus according to an embodiment of the present invention is not limited to the above-described decrypting apparatus. Any embodiments of the decrypting apparatus are available.

That is, the information processing apparatus of this invention can be achieved by any embodiment that satisfies the following condition.

That is, an information processing apparatus decrypts encrypted data (data obtained by encrypting stream data) using meta data including update information. The encrypted data is encrypted according to a first encryption method in which, when stream data including a plurality of successive units of data is sequentially encrypted on a unit-by-unit basis using an encryption key being updated in accordance with a predetermined rule, an encryption key that is present at the encryption time is used. The update information identifies the plurality of encryption keys used for encrypting the stream data and the update timings of the plurality of encryption keys. The information processing apparatus includes a decrypting unit and a meta data acquiring unit. The decrypting unit acquires the encrypted data and decrypts each of the plurality of encrypted units of data of the encrypted data using a decryption key corresponding to the encryption key used for encrypting the unit of data among the plurality of encryption keys. The meta data acquiring unit acquires the meta data and generates each of the plurality of decryption keys corresponding to one of the plurality of encryption keys contained in the meta data. The meta data acquiring unit delivers the corresponding one of the decryption keys to the decrypting unit. The plurality of encryption key are encrypted according to a second encryption method. The meta data acquiring unit includes a decryption key generating unit, an update instructing unit, a decryption key output unit, and an update instruction control unit. The decryption key generating unit sequentially generates each of the plurality of decryption keys by decrypting one of the plurality of encryption keys contained in the meta data and encrypted using the second encryption method in an order in which the key is used for encryption. The update instructing unit identifies the update timing of each of the decryption keys corresponding to the update timing of one of the encryption keys and issues an update command at each identified update timing. The decryption key output unit outputs a first decryption key generated by the decryption key generating unit until the update instructing unit issues the update command to the decrypting unit. After the update instructing unit issues the update command, the decryption key output unit outputs a second decryption key generated subsequently to the first decryption key by the decryption key generating unit to the decrypting unit. The update instruction control unit determines whether the second decryption key has been generated by the decryption key generating unit before each of the update timings of the decryption keys occurs. If the update instruction control unit determines that the second decryption key has not been generated yet, the update instruction control unit monitors whether the second decryption key is generated. When the second decryption key is generated, the update instruction control unit considers that point in time to be the update timing from the first decryption key to the second decryption key so as to control the update instructing unit to issue the update command. If an information processing apparatus satisfies these conditions, this information processing apparatus is applicable to any embodiment of the present invention.

That is, if the decrypting unit, the meta data acquiring unit, the decryption key generating unit, the update instructing unit, the decryption key output unit, and the update instruction control unit have the above-described functionality, these are applicable to any embodiment of the present invention.

The above-described series of processes can be executed not only by hardware but also by software. When the above-described series of processes are executed by software, the programs of the software are installed from a program recording medium into a computer incorporated in dedicated hardware or a computer that can execute a variety of function by installing a variety of programs therein (e.g., a general-purpose personal computer).

Figure 10:
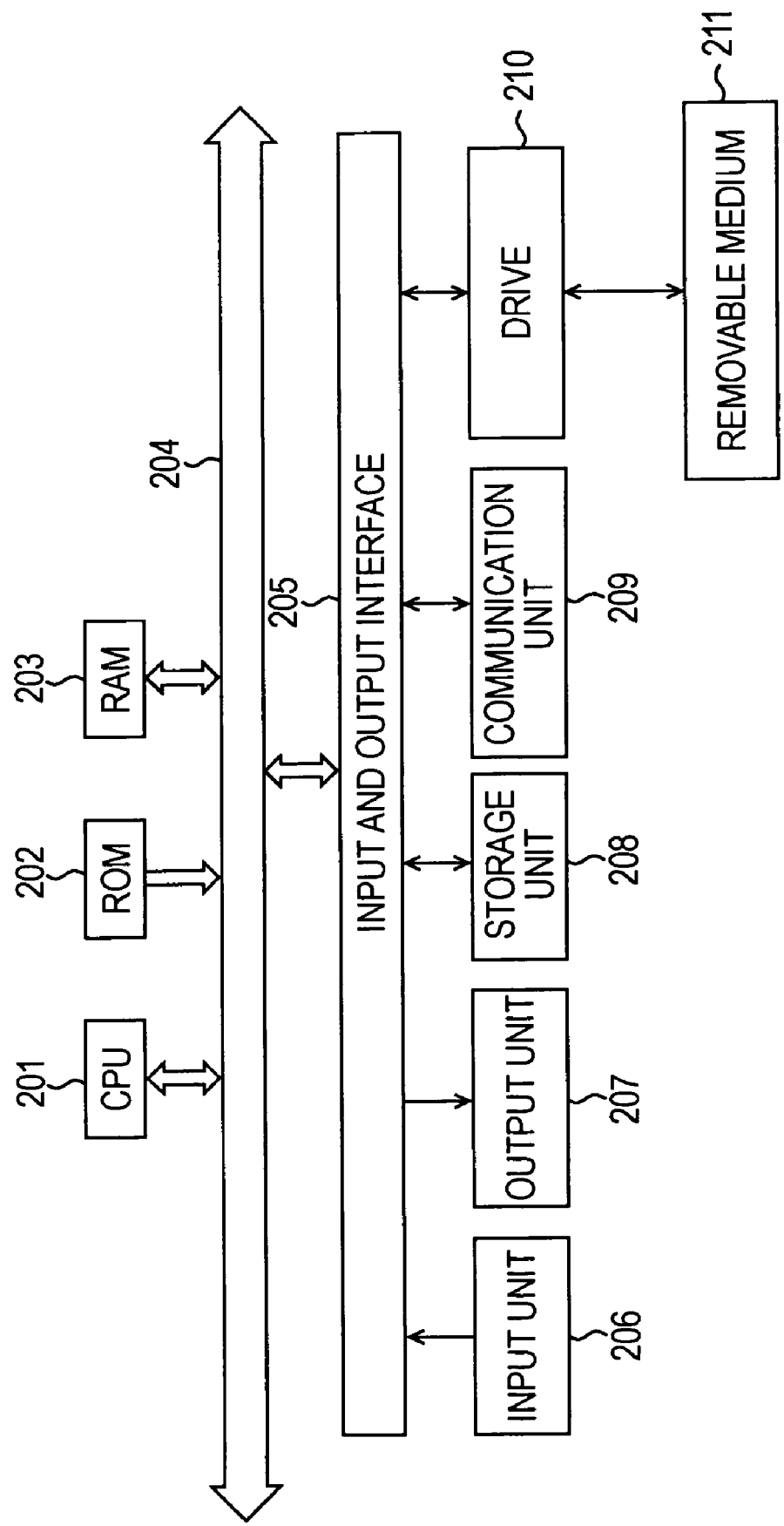
FIG. 10 is a block diagram of an exemplary structure of a personal computer that executes a program according to an embodiment of the present invention.

FIG. 10 is a block diagram of an exemplary structure of a personal computer that executes a program realizing the above-described series of operations. That is, for example, when the above-described series of operations are executed using the program, the meta data extracting unit 21 and the like can be realized using a personal computer or part of the personal computer having the structure shown in FIG. 8.

In FIG. 10, a central processing unit (CPU) 201 carries out a variety of processes according to a program stored in a read only memory (ROM) 202 or a storage unit 208. A random access memory (RAM) 203 stores a program executed by the CPU 201 and data as needed. The CPU 201, the ROM 202, and the RAM 203 are connected to each other via a bus 204.

Additionally, an input and output interface 205 is connected to the CPU 201 via the bus 204. An input unit 206 including a keyboard, a mouse, and a microphone and an output unit 207 including a display and a speaker are connected to the input and output interface 205. The CPU 201 executes a variety of processes in response to a command input from the input unit 206. Subsequently, the CPU 201 outputs the processing result to the output unit 207.

The storage unit 208 connected to the input and output interface 205 includes, for example, a hard disk, and stores a program that is executed by the CPU 201 and a variety of data. A communication unit 209 communicates with external apparatuses via a network (such as the Internet and a local area network).

Additionally, the program may be acquired via the communication unit 209 and may be stored in the storage unit 208.

A drive 210 connected to the input and output interface 205 drives a removable medium 211, such as a magnetic disk, an optical disk, a magnetooptical disk, or a semiconductor memory, when the removable medium 211 is mounted. Thus, the drive 210 acquires a program and data stored in the removable medium 211. The acquired program and data are transferred to the storage unit 208 as needed so that the transferred program and data are stored in the storage unit 208.

As shown in FIG. 10, examples of the program recording medium that stores a computer-executable program after the program is installed in the computer include the removable medium 211, the ROM 202 that temporarily or permanently stores the program, and a hard disk serving as the storage unit 208. The removable medium 211 is a package medium including a magnetic disk (including a flexible disk), an optical disk (including a compact disk-read only memory (CD-ROM) and a digital versatile disc (DVD)), a magnetooptical disk, and a semiconductor memory. The program is stored in the program recording medium via the communication unit 209 serving as an interface with a router or a modem using wired or wireless communications.

As used herein, the steps that describe the program stored in the program recording media include not only processes executed in the above-described sequence, but also processes that may be executed in parallel or independently.

As used herein, the term "system" refers to a combination of a plurality of apparatuses.

Furthermore, the embodiment of the present invention is applicable to not only the above-described system shown in FIG. 1 but also a variety of systems. For example, in the example shown in FIG. 1, the meta data 64 and the encrypted AV data obtained by encrypting AV data by means of the AV-data encrypting unit 32 are together transmitted from the encrypting apparatus 1 to the decrypting apparatus 2 as the meta-data overlapped and encrypted AV data. However, the meta data 64 and the encrypted AV data are not necessarily transmitted together. That is, the embodiment of the present invention is applicable to a system that transmits the meta data via a transmission channel different from that for the encrypted AV data.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus configured to decrypt, using meta data, encrypted data obtained by encrypting stream data including a plurality of successive units of data according to a first encryption method in which, when the stream data is sequentially encrypted on a unit-by-unit basis, each of a plurality of encryption keys, used for encrypting a corresponding one of the units of data, is updated on the basis of a predetermined rule, the meta data including the plurality of the encryption keys used for encrypting the stream data and update information for identifying update timings of the plurality of encryption keys, the apparatus comprising:

a decrypter configured to acquire the encrypted data and decrypt each of the encrypted units of data in the encrypted data using a decryption key corresponding to the encryption key used for encrypting the unit of data among the plurality of encryption keys; and a meta data acquirer configured to acquire the meta data, to generate each of the plurality of decryption keys corresponding to one of the plurality of encryption keys included in the meta data, and to deliver the corresponding one of the plurality of decryption keys to the decrypter in accordance with the update information included in the meta data;

wherein the plurality of encryption key are encrypted according to a second encryption method and the meta data acquirer includes, a decryption key generating unit,
an update instructing unit,
a decryption key output unit, and
an update instruction control unit, wherein the decryption key generating unit sequentially generates each of the plurality of decryption keys on a unit-by-unit basis by decrypting one of the plurality of encryption keys included in the meta data and encrypted using the second encryption method in an order in which the keys are used for encryption, the update instructing unit identifies the update timing of each of the decryption keys corresponding to the update timing of one of the encryption keys and issues an update command at each identified update timing, the decryption key output unit outputs a first decryption key generated by the decryption key generating unit to the decrypter until the update instructing unit issues the update command and outputs a second decryption key generated subsequent to the first decryption key by the decryption key generating unit to the decrypter after the update instructing unit issues the update command, the update instruction control unit determines whether the second decryption key has been generated by the decryption key generating unit before the first decryption key is updated to the second decryption key, and monitors whether the second decryption key is generated if the update instruction control unit determines that the second decryption key has not been generated yet, and when the second decryption key is generated, the update instruction control unit considers the second decryption key generation point in time to be the update timing from the first decryption key to the second decryption key so as to control the update instructing unit to issue the update command.

2. The information processing apparatus according to claim 1, wherein each of the plurality of encryption keys includes a key ID for identifying the encryption key, and the meta data includes Meta packets 1, 2, and 3 that are generated for each of the plurality of units of data and that comply with Society of Motion Picture and Television Engineers (SMPTE) 291M, and a predetermined one of the plurality of encryption keys encrypted according to the second encryption method is included in the Meta packets 1 and 2 associated with a predetermined unit of data, and wherein at least Next Key ID and Current Key ID are included in the Meta packet 3 associated with each of the units of data.

3. The information processing apparatus according to claim 2, wherein the update instruction control unit compares a Key ID of an encryption key corresponding to a decryption key generated by the decryption key generating unit immediately before an update timing from the first decryption key to the second decryption key with the Next Key ID included in the Meta packet 3 associated with the unit of data immediately before the update timing from the first decryption key to the second decryption key, and if the Key ID is equal to the Next Key ID, the update instruction control unit determines that the second decryption key has been generated by the decryption key generating unit, and if the Key ID is not equal to the Next Key ID, the update instruction control unit determines that the second decryption key has not been generated by the decryption key generating unit.

4. The information processing apparatus according to claim 3, wherein if the update instruction control unit determines that the second decryption key has not been generated by the decryption key generating unit, the update instruction control unit compares a Key ID of the encryption key corresponding to the latest decryption key generated by the decryption key generating unit after a first point in time at which the determination is made with the Current Key ID included in the Meta packet 3 associated with a unit of data after the first point in time, and if the Key ID is equal to the Current Key ID, the update instruction control unit determines that the second decryption key has been generated by the decryption key generating unit, considers a second point in time at which the determination is made to be an update timing from the first decryption key to the second decryption key, and forces the update instructing unit to issue the update command.

5. An information processing method comprising:

decrypting, in an information processing apparatus by using meta data, encrypted data obtained by encrypting stream data including a plurality of successive units of data according to a first encryption method in which, when the stream data is sequentially encrypted on a unit-by-unit basis, each of a plurality of encryption keys used for encrypting a corresponding one of the units of data is updated on the basis of a predetermined rule, the meta data including the plurality of the encryption keys used for encrypting the stream data and update information for identifying update timings of the plurality of encryption keys, the information processing apparatus including a decrypter configured to acquire the encrypted data and decrypt each of the encrypted units of data in the encrypted data using a decryption key corresponding to the encryption key used for encrypting the unit of data among the plurality of encryption keys, wherein the plurality of encryption keys are encrypted according to a second encryption method;

acquiring the meta data;

sequentially generating each of the plurality of decryption keys on a unit-by-unit basis by decrypting one of the plurality of encryption keys included in the meta data and encrypted using the second encryption method in an order in which the keys are used for encryption;

identifying the update timing of each of the decryption keys corresponding to the update timing of one of the encryption keys and issuing an update command at each identified update timing;

outputting a first generated decryption key until the update command is issued and outputting a second decryption key generated subsequent to the first decryption key after the update command is issued; and determining whether the second decryption key has been generated before the first decryption key is updated to the second decryption key; and monitoring whether the second decryption key is generated if the second decryption key has not been generated yet, and, when the second decryption key is generated, considering the second decryption key generation point in time to be the update timing from the first decryption key to the second decryption key so as to perform control to issue the update command.

6. A computer-readable storage medium having embedded therein instructions, which when executed by a processor, cause the processor to decrypt, using meta data, encrypted data obtained by encrypting stream data including a plurality of successive units of data according to a first encryption method in which, when the stream data is sequentially encrypted on a unit-by-unit basis, each of a plurality of encryption keys used for encrypting a corresponding one of the units of data is updated on the basis of a predetermined rule, the meta data including the plurality of the encryption keys used for encrypting the stream data and update information for identifying update timings of the plurality of encryption keys, the program causing the computer to acquire the encrypted data and decrypt each of the encrypted units of data in the encrypted data using a decryption key corresponding to the encryption key used for encrypting the unit of data among the plurality of encryption keys, wherein the plurality of encryption keys are encrypted according to a second encryption method, the program comprising:

acquiring the meta data;

sequentially generating each of the plurality of decryption keys on a unit-by-unit basis by decrypting one of the plurality of encryption keys included in the meta data and encrypted using the second encryption method in an order in which the keys are used for encryption;

identifying the update timing of each of the decryption keys corresponding to the update timing of one of the encryption keys and issuing an update command at each identified update timing;

outputting a first generated decryption key until the update command is issued and outputting a second decryption key generated subsequent to the first decryption key after the update command is issued; and determining whether the second decryption key has been generated before the first decryption key is updated to the second decryption key; and monitoring whether the second decryption key is generated if the second decryption key has not been generated yet, and, when the second decryption key is generated, considering the second decryption key generation point in time to be the update timing from the first decryption key to the second decryption key so as to perform control to issue the update command.

* * * * *